(12) United States Patent
Klink et al.

(10) Patent No.: US 10,451,080 B2
(45) Date of Patent: Oct. 22, 2019

(54) CENTRIFUGAL FAN HAVING COMBINED SEALING AND VIBRATION ISOLATION

(71) Applicant: ebm-papst Landshut GmbH, Landshut (DE)

(72) Inventors: Hans-Joachim Klink, Erolzheim (DE); Frank Schlopakowski, Landshut (DE); Martin Deininger, Geisenhausen (DE); Roland Keber, Worth (DE)

(73) Assignee: ebm-papst Landshut GmbH, Landshut (DE)

( * ) Notice: Subject to any disclaimer, the term of this patent is extended or adjusted under 35 U.S.C. 154(b) by 365 days.

(21) Appl. No.: 14/909,469

(22) PCT Filed: Apr. 22, 2014

(86) PCT No.: PCT/EP2014/058089
§ 371 (c)(1),
(2) Date: Feb. 2, 2016

(87) PCT Pub. No.: WO2015/014507
PCT Pub. Date: Feb. 5, 2015

(65) Prior Publication Data
US 2016/0195101 A1    Jul. 7, 2016

(30) Foreign Application Priority Data

Aug. 2, 2013   (DE) .................. 10 2013 108 370
Aug. 29, 2013  (DE) .................. 10 2013 109 402

(51) Int. Cl.
*F04D 29/08*    (2006.01)
*F04D 17/16*    (2006.01)
(Continued)

(52) U.S. Cl.
CPC ........... *F04D 29/083* (2013.01); *F04D 17/16* (2013.01); *F04D 25/06* (2013.01); *F04D 25/08* (2013.01); *F04D 29/624* (2013.01); *F04D 29/626* (2013.01); *F04D 29/668* (2013.01)

(58) Field of Classification Search
CPC .......... F04D 17/08; F04D 17/10; F04D 17/16; F04D 25/06; F04D 25/062;
(Continued)

(56) References Cited

U.S. PATENT DOCUMENTS 2,680,559 A * 6/1954 Morrill ................. F04D 29/057
                                                    416/134 R
4,726,112 A * 2/1988 King .................... F16C 27/063
                                                    248/581

(Continued)

FOREIGN PATENT DOCUMENTS

DE           9108745 U1    11/1992
DE       102009036149 A1   12/2010
(Continued)

OTHER PUBLICATIONS

International Search Report (in German with English Translation) for PCT/EP2014/058089, dated Aug. 5, 2014; ISA/EP.

*Primary Examiner* — Bryan M Lettman
*Assistant Examiner* — Charles W Nichols
(74) *Attorney, Agent, or Firm* — Harness, Dickey & Pierce, P.L.C.

(57) ABSTRACT

The invention relates to a centrifugal fan having a fan housing with an electric motor which is provided outside on the fan housing and is supported by a motor mounting, said motor mounting being sealed relative to the fan housing by means of a seal which is at the same time the vibration-isolating element between the electric motor and the fan wheel provided in the fan housing.

12 Claims, 3 Drawing Sheets

(51) Int. Cl.
*F04D 25/08* (2006.01)
*F04D 29/62* (2006.01)
*F04D 29/66* (2006.01)
*F04D 25/06* (2006.01)

(58) Field of Classification Search
CPC .. F04D 25/0606; F04D 25/0673; F04D 25/08; F04D 25/082; F04D 25/12; F04D 29/002; F04D 29/04; F04D 29/0405; F04D 29/08; F04D 29/083; F04D 29/086; F04D 29/12; F04D 29/102; F04D 29/122; F04D 29/2266; F04D 29/28; F04D 29/281; F04D 29/40; F04D 29/42; F04D 29/4206; F04D 29/4226; F04D 29/602; F04D 29/403; F04D 29/601; F04D 29/602; F04D 29/62; F04D 29/626; F04D 29/056; F04D 29/059; F04D 29/661; F04D 29/582; F04D 29/624; F04D 29/668; H02K 5/15; H02K 5/16; H02K 5/24; H02K 5/26
See application file for complete search history.

(56) References Cited

U.S. PATENT DOCUMENTS

| | | | |
|---|---|---|---|
| 5,388,970 A * | 2/1995 | Muckelmann | F04D 25/082 415/208.1 |
| 5,786,647 A | 7/1998 | Vollmer et al. | |
| 7,520,734 B2 * | 4/2009 | Luedtke | F04D 29/662 417/423.1 |
| 2005/0265869 A1 * | 12/2005 | Blom | B60S 5/04 417/441 |
| 2008/0303225 A1 * | 12/2008 | Franz | F04D 29/083 277/630 |
| 2015/0028179 A1 | 1/2015 | Hertreiter et al. | |

FOREIGN PATENT DOCUMENTS

| | | |
|---|---|---|
| DE | 102011013685 A1 | 9/2012 |
| GB | 2258766 A | 2/1993 |
| JP | S59114500 U | 8/1984 |

* cited by examiner

CENTRIFUGAL FAN HAVING COMBINED SEALING AND VIBRATION ISOLATION

CROSS REFERENCE TO RELATED APPLICATIONS

This application is a U.S. National Phase Application under 35 U.S.C. 371 of International Application No. PCT/EP2014/058089 filed on Apr. 22, 2014 and published as WO 2015/014507 A1 on Feb. 5, 2015. This application claims priority to German Application No. 10 2013 108 370.6 filed on Aug. 2, 2013 and German Application No. 10 2013 109 402.3 filed on Aug. 29, 2013. The entire disclosures of all of the above applications are incorporated herein by reference.

DESCRIPTION

The invention relates to a centrifugal fan having a fan housing with a passage opening arranged to the side for a driveshaft, an electric motor arranged on one side on the fan housing and supported by a motor mounting, wherein the motor mounting has a section that extends into the passage opening, and a seal is provided which bears against the motor mounting and the fan housing.

The seal according to the invention fulfills three tasks, namely the sealing of the motor mounting relative to the fan housing, vibration isolation between the electric motor or the motor mounting, respectively, and the fan housing, and the attachment of the motor mounting with to the electric motor on the fan housing.

Vibration-damping receiving devices for the electric motor for attachment on a fan housing are known from the prior art. For example, DE 10 2011 013 685 A1 discloses a device for accommodating a motor on a fan housing wall with several resilient damping elements which are in connection with the motor mounting via receiving devices arranged on the housing wall, wherein their respective axial central axes point in the direction of the motor in order to achieve a vibration isolation relative to the fan wheel.

Furthermore, it is known to seal the driveshaft of the electric motor from influences from outside, wherein the shaft seal simultaneously is the accommodation for a bearing. Prior art that pertains to this is DE 10 2009 036 149 A1, for example, in which a sealing arrangement is disclosed, which is in the shape of a pot, wherein a shaft bearing is inserted into the shaft sealing arrangement.

The solutions according to the prior art, which were provided by the applicant, have often been found to be satisfactory in practice. However, in the case of an angled vibration isolation according to DE 10 2011 013 685 A1, a predetermined distance between the motor mounting and the housing wall must be provided in order to be able to arrange the resilient elements at an appropriate angle. This leads to an increased space requirement in the axial direction of the driveshaft. Furthermore, the number of the elements needed for the shaft sealing and vibration isolation is relatively high, since, in addition to the shaft sealing, at least three resilient elements have to be provided for the vibration isolation. In the prior art, the attachment of the motor mounting on the fan housing wall occurs by means of screws that also generate costs as add-on components and represent a relatively expensive installation.

On this background, the problem of the invention is to provide a centrifugal fan whose sealing in the area of the inlet of the driveshaft of the electric motor into the fan housing is combined with a vibration isolation of the electric motor or of the motor mounting with electric motor, in order to lower the number of the parts and reduce the installation space in the axial direction of the driveshaft.

A centrifugal fan having a fan housing with passage opening arranged on the side for a driveshaft, and with an electric motor arranged on the outside on the fan housing and supported by a motor mounting, is provided, wherein the motor mounting comprises a section that extends into the passage opening, and a seal is provided which bears against the motor mounting and the fan housing so that an area of the passage opening between the motor mounting and the fan housing is sealed, and in the mounted state, the motor mounting bears at least in some sections against the seal in an axial area between the motor mounting and the fan housing. The sealing of the passage opening occurs because the seal bears against both the motor mounting and also the fan housing. The vibration isolation between the electric motor and the fan wheel arranged inside the fan housing also occurs via the seal and its arrangement between the motor mounting and the fan housing, wherein, in the mounted state of the centrifugal fan, the fan housing bears against the seal over a predetermined surface area. After the seal itself has been provided as vibration-isolating element between motor mounting and fan housing, additional resilient vibration-isolating elements, as used in the prior art, arranged spaced apart in the peripheral direction, are not necessary.

In an advantageous embodiment of the invention, the seal is designed so as to enclose a margin of the passage opening of the fan housing. For this purpose, it is preferable that the seal has a cylindrical, polygonal, in particular hexagonal, or elliptic section, which has a groove on its outer surface in which the margin of the passage opening engages. The seal thus bears against the motor mounting on two surfaces, namely the radially external surface of the section that extends into the passage opening, and against the section that extends radially outward and faces the housing wall. The result thus is a stabilization of the motor mounting opposite the housing wall via the two surfaces.

In an advantageous embodiment, the motor mounting is attached by means of the seal on the fan housing. Here, as an advantageous solution, it is provided that the section of the motor mounting that extends into the passage opening is supported by means of an attachment means on the seal, thus attaching the motor mounting indirectly on the fan housing. In a first embodiment, such an attachment means is a securing ring which encloses the section of the motor mounting extending into the passage opening. On the radial outer surface of the section of the motor mounting, that extends into the passage opening, it is advantageous to provide a groove in which the securing ring engages. Thus, the final mounting position of the motor mounting on the fan housing is also established by the distance of the groove from the seal. In the mounted state, the securing ring bears against the seal and clamps the motor mounting indirectly on the fan housing.

In an alternative embodiment, the attachment means is an undercut molded on the motor mounting, in particular, an undercut molded on the section of the motor mounting that extends into the passage opening and, in the mounted state, bears against the seal and attaches or clamps the motor mounting via the seal indirectly on the fan housing. For the installation, it is advantageously provided that the section of the motor mounting extending into the passage opening has a cylindrical, polygonal, in particular hexagonal, or elliptic form and is inserted through the seal which is also at least in some sections cylindrically or form-fitting.

The vibration isolation occurs via the seal itself, wherein, for this purpose, in the axial area between the motor mounting and the fan housing, said seal has an axial height of at least 1 mm, preferably 1-5 mm. The radial length of the seal in the axial area with respect to the motor mounting and the fan housing is at least 2 mm, preferably 2-20 mm. To the extent that the seal does not have a uniform shape, the above-mentioned values relate to the respective maximum values. The radial length is measured from the bearing point of the seal on the motor mounting.

Furthermore, it is advantageous that, in the axial area between the motor mounting and the fan housing, in which the motor mounting bears against the seal, the seal has a shape that is complementary to the motor mounting. For example, it is provided that the surfaces facing one another form a catch mechanism between the motor mounting and the seal. Furthermore, wave-shaped, rib-shaped and knob-shaped forms can be provided, or protrusions can be formed on the motor mounting, which protrude into corresponding recesses of the surface of the seal or of the motor mounting. As a result, a further attachment of the motor mounting on the seal is made possible, wherein, for example, a mounting position of the motor installation is also established.

In a further embodiment, it is provided that, at the passage opening, the fan housing has a base whose base margin facing the passage opening forms the margin of the passage opening. The base is used to enlarge the area that can be used for the sealing between the motor mounting and the fan wheel arranged in the fan housing. Moreover, the above-mentioned features pertaining to the margin of the passage opening of the fan housing are also applicable to the base margin. Due to the use of a base, between the motor mounting and the base, an area is provided that can be covered in some sections or completely by the seal.

The seal used is preferably made from elastomer material, for example, silicone rubber, and has a hardness of 20-60 Shore A.

In a variant, as an advantageous embodiment, it is provided that the fan housing or at least its side cover as well as the motor mounting are made from plastic. The two components can then be inserted in the tool and the seal can be injection molded in the desired position. Alternatively, it is possible moreover to produce the side cover from metal, to injection mold the seal on the plastic motor mounting, and to attach the motor mounting with injection molded seal on the side cover.

All the features mentioned above can be combined in all variants, to the extent that this is technically possible.

Other advantageous variants of the invention are characterized in the dependent claims and are represented in further detail below along with the description of the preferred embodiment of the invention in reference to figures.

The figures are diagrammatic examples. Identical reference numerals mark identical parts in all the views.

Figure 1:
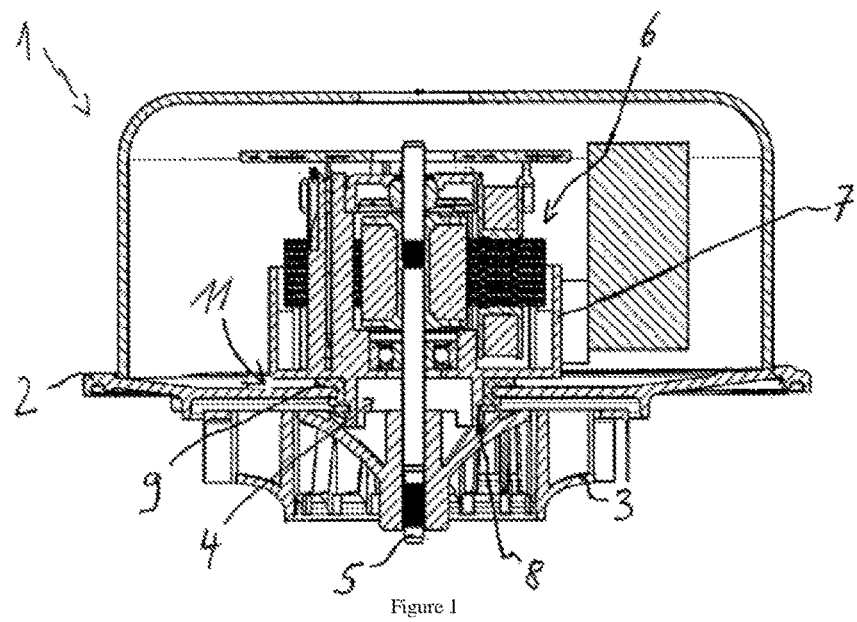
FIG. 1 shows a cross-sectional side view of a centrifugal fan with lateral motor structure according to the invention.

FIG. 1 shows the centrifugal fan 1 with a fan housing 2, of which only the side cover is represented; the other parts of the fan housing surrounding the fan wheel 3 are not shown. The fan housing 2 has a passage opening 4 arranged on the side for a driveshaft 5 of an electric motor 6. The electric motor 6 is attached to a motor mounting 7 and has a section 8 that extends into the passage opening 4 and into the interior of the fan housing 2. Between the fan housing 2 and the motor mounting 7, a seal 9 is arranged so that the area of the passage opening 4 between the motor mounting 7 and the fan housing 2 is sealed. Furthermore, in the mounted state according to FIG. 1, in the axial area 11 between the motor mounting 7 and the fan housing 2, the motor mounting 7, along its surface facing the fan housing wall, bears against the seal 9.

Figure 2:
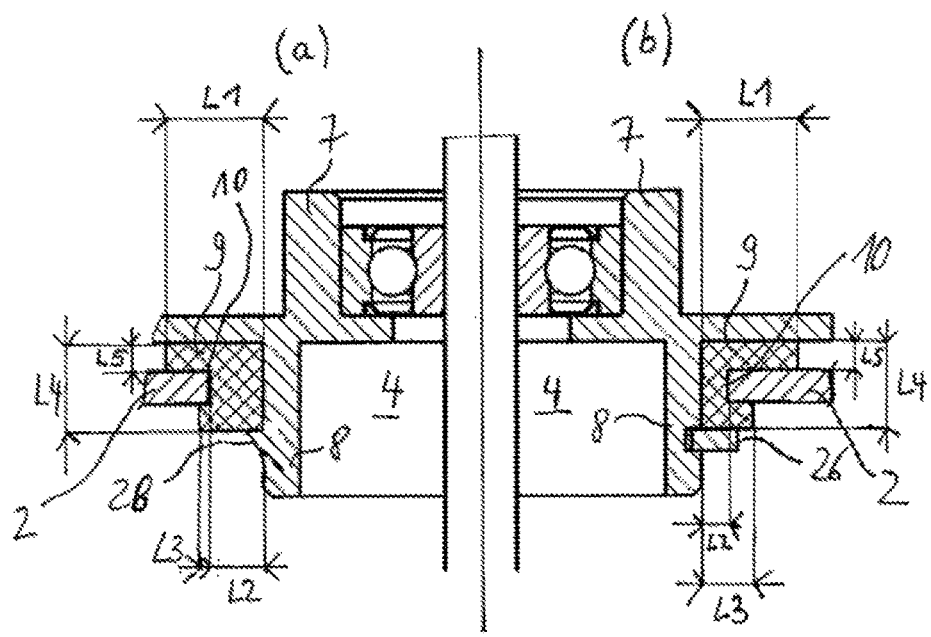
FIG. 2 shows a cross-sectional side view of two embodiments of the arrangement of the seal according to the invention.

FIG. 2 shows the arrangement of the motor mounting 7 on the fan housing in two alternative embodiment variants (a) and (b). In embodiment (a), the motor mounting 7 is inserted through the cylindrical seal 9 and attached to the seal 9 via an undercut 28 molded on the motor mounting 7. The motor mounting 7 is thus attached and clamped on the fan housing 2 via the seal 9, so that, in addition to the sealing function, the seal 9 fulfills the function of vibration isolation between the structure formed by motor mounting 7 with electric motor 6 and the fan housing 2. The undercut 28 is formed on the section 8 of the motor mounting 7 that extends through the passage opening 4 into the interior of the fan housing 2. The seal 9 encloses the margin 10 of the fan housing 2 forming the passage opening 4. The dimensions of the seal 9 are selected so that the sealing and vibration isolation function is reliably ensured. For this purpose, in the axial area 11 between the motor mounting 7 and the fan housing 2, the seal has an axial height of more than 2 mm. In the embodiment shown, the seal 9 is designed so that it is circular over the periphery and, in the axial area 11 between the motor mounting 7 and the fan housing 2, it has a radial length L1 of 8 mm. The broader the radial extent of the seal is, the greater the application surface and thus the damping and the stability of the motor mounting 7. The radial extent L2 of the seal 9 corresponds substantially to that of the total height L4 and is in each case in a range of 1-8 mm. In the embodiment shown, L1>L4, L2>L5, L3<L1 and L4>L2. A design where L1≥L4, L2≥L5, L3≤L1 and L4≥L2 would also be possible. The mutually facing surfaces of the seal 9 and the motor mounting 7 have a complementary shape. In the embodiment shown, this shape is flat.

The alternative embodiment according to FIG. 2, shown under (b) substantially corresponds to the features of (a). The embodiment differs with regard to the attachment of the motor mounting 7 on the seal 9, since, in embodiment (b), a securing ring 26 for stopping the motor mounting 7 on the seal 9 is inserted. For this purpose, the motor mounting 7 has a peripheral groove, in which the securing ring 26 engages. The seal 9 also surrounds the margin 10 of the fan housing 2, wherein the dimensions of the seal are the following, L1≥L4, L2≤L5, L3<L1 and L4>L2.

Figure 3:
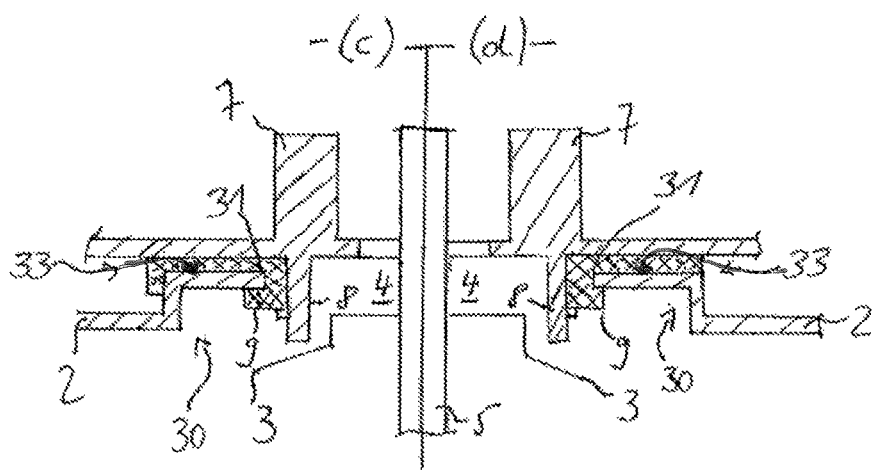
FIG. 3 shows two other alternative embodiments of the arrangement of the seal according to the invention.

In FIG. 3, additional embodiments of the arrangement of the seal 9 are represented diagrammatically. In the two embodiments (c) and (d), on the fan housing 2, at the passage opening 4, a base 30 is formed, whose base margin 31 facing the passage opening 4 forms the margin of the passage opening 4. The seal 9 encloses the base margin 31 in both embodiments. In embodiment (c), the seal 9 extends over the entire surface 33 of the base 30, wherein the seal 9 overlaps the radially external base margin. In embodiment (d), the seal 9 ends radially externally with the radially external base margin and it ends flush with the latter. The longitudinal dimensions are not depicted explicitly; however, the marks from FIG. 2 also apply in FIG. 3. In embodiments (c) and (d), the dimensions are as follows: L1>L4, L2≥L5, L3<L1 and L4>L2.

Figure 4:
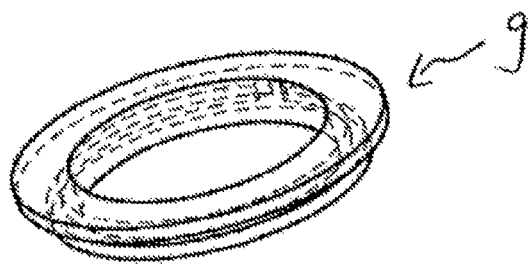
FIG. 4 shows an embodiment of the seal.
Figure 5:
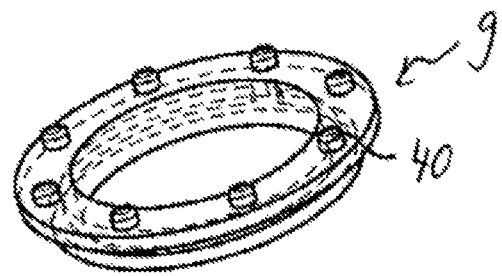
FIG. 5 shows an additional embodiment of the seal.
Figure 6:
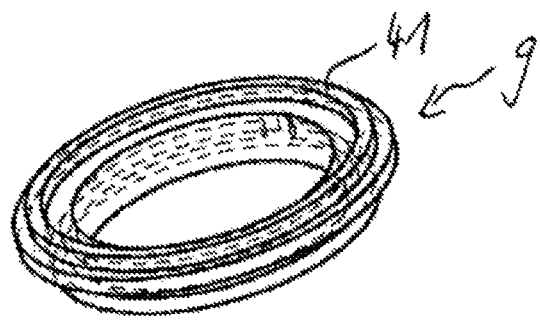
FIG. 6 shows an additional embodiment of the seal.
Figure 7:
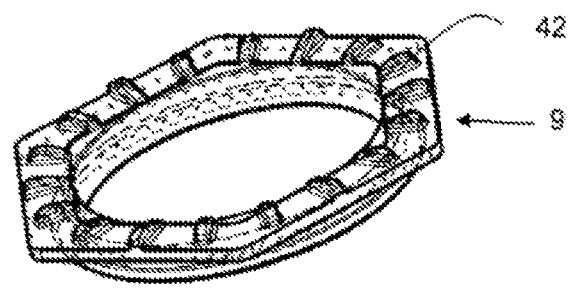
FIG. 7 shows an additional embodiment of the seal.

In FIGS. 4 to 7, additional embodiments of the seal 9 are represented in perspective. FIG. 4 shows the seal in a flat design, as used in FIGS. 1, 2 and 3. FIGS. 5 and 6 show surfaces of the seal 9 with knobs 40 or a groove 41, which can engage in corresponding recesses in the motor mounting 7. FIG. 7 shows the seal 9 with ribs 42 formed thereon. Alternatively, the motor mounting 7 can also have a flat design in an embodiment according to FIG. 2, so as to bear against the knobs 40, the groove 41 or the ribs 42.

In all the embodiments, the seal has a hardness of 20-60 Shore A, in particular 20-50 Shore A. The seal is made of elastomer material, preferably silicone rubber, NBR or FKM.

In its design, the invention is not limited to the preferred embodiment examples indicated above. Rather, a number of variants are conceivable, which use the represented solution even in the case of designs of fundamentally different type. As an example, the surface of the motor mounting facing the fan housing can have a catch mechanism that engages in a complementary surface of the seal.

The invention claimed is:

1. A centrifugal fan comprising
   a fan housing with a passage opening arranged for a driveshaft, an electric motor, including a drive shaft, arranged on the outside on the fan housing and supported by a motor mounting, wherein
   the motor mounting has a first section which extends into the passage opening,
   an elastomeric seal is provided which bears directly against the motor mounting and a base of the fan housing so that
   an area of the passage opening between the motor mounting and the fan housing base is sealed, the base of the fan housing extends in an axial direction towards the motor, the seal encloses a margin of the passage opening of the fan housing and the seal extends over an entire surface of the base so that the seal overlaps a radially external base margin, and a portion of the seal extends axially with respect to an axis of the electric motor drive shaft; and
   in the mounted state, the motor mounting bears against the seal so that the seal bears directly against a radially external surface of the first section of the motor mounting that extends into the passage opening and also bears directly against a second section of the motor mounting that extends radially outward and faces the fan housing.

2. The centrifugal fan according to claim 1, wherein the seal works in an oscillation-isolating manner between the motor mounting and the fan housing.

3. The centrifugal fan according to claim 1, wherein the section of the motor mounting that extends into the passage opening is supported by means of an attachment on the seal, thus attaching the motor mounting indirectly on the fan housing.

4. The centrifugal fan according to claim 3, wherein the attachment is a securing ring which encloses the section of the motor mounting that extends into the passage opening.

5. The centrifugal fan according to claim 3, wherein the attachment is an undercut molded on the section of the motor mounting that extends into the passage opening.

6. The centrifugal fan according to claim 1, wherein the section of the motor mounting that extends into the passage opening is inserted through the seal.

7. The centrifugal fan according to claim 1, wherein the motor mounting is attached prestressed on the fan housing, wherein the prestressing is achieved by a resilient property of the seal.

8. The centrifugal fan according to claim 1, wherein in the axial area between the motor mounting and the fan housing, the seal has an axial height of at least 1 mm.

9. The centrifugal fan according to claim 1, wherein the seal is designed as peripheral and, in the axial area between the motor mounting and the fan housing, it has a radial length of at least 2 mm.

10. The centrifugal fan according to claim 1, wherein the seal has a total axial length of at least 3 mm.

11. The centrifugal fan according to claim 1, wherein in the axial area between the motor mounting and the fan housing, in which the seal bears against a motor mounting, the seal has a shape that is complementary to the motor mounting.

12. The centrifugal fan according to claim 1, wherein the seal is formed from an elastomer material and has a hardness of 20-60 Shore A.

* * * * *